United States Patent
Ozanoglu et al.

(10) Patent No.: US 9,698,691 B2
(45) Date of Patent: Jul. 4, 2017

(54) CIRCUIT AND METHOD FOR MAXIMUM DUTY CYCLE LIMITATION IN SWITCHING CONVERTERS

(71) Applicant: Dialog Semiconductor (UK) Limited, Reading (GB)

(72) Inventors: Kemal Ozanoglu, Istanbul (TR); Selcuk Talay, Istanbul (TR); Pier Cavallini, Swindon (GB); Naoyuki Unno, Kawasaki (JP); Louis deMarco, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 63 days.

(21) Appl. No.: 14/730,705

(22) Filed: Jun. 4, 2015

(65) Prior Publication Data
US 2016/0359414 A1    Dec. 8, 2016

(51) Int. Cl.
*H02M 3/158*   (2006.01)
*H02M 1/00*    (2006.01)

(52) U.S. Cl.
CPC .. *H02M 3/1582* (2013.01); *H02M 2001/0009* (2013.01); *H02M 2001/0025* (2013.01)

(58) Field of Classification Search
CPC ........ H02M 3/10; H02M 3/137; H02M 3/142; H02M 3/155; H02M 3/156; H02M 3/158; H02M 3/1582
See application file for complete search history.

(56) References Cited

U.S. PATENT DOCUMENTS

| 4,245,286 A | 1/1981 | Paulkovich et al. |
| 4,578,630 A | 3/1986 | Grosch |
| 6,979,988 B2 | 12/2005 | Sutardja et al. |

(Continued)

FOREIGN PATENT DOCUMENTS

EP    1524568    4/2005

OTHER PUBLICATIONS

Co-pending U.S. Appl. No. 14/870,113, filed Sep. 30, 2015, "Circuit and Method for Maximum Duty Cycle Limitation in Step Up Converters," by Naoyuki Unno et al., 42 pgs.

(Continued)

*Primary Examiner* — Matthew Nguyen
(74) *Attorney, Agent, or Firm* — Saile Ackerman LLC; Stephen B. Ackerman; Billy Knowles

(57) ABSTRACT

A switching DC-to-DC converter has an adaptive duty cycle limiting circuit with an inductor current sensor to generate a sense signal indicative of magnitude of the inductor current. A replica signal is generated from the sense signal and transferred through a replica parasitic resistance circuit. A differential voltage is developed across the replica parasitic resistances and compared with a maximum limit voltage level. The maximum limit voltage level is indicates that a gain level of the switching DC-to-DC converter has decreased even though the duty cycle has increased. A duty cycle limit signal is generated and transferred to disable a switch in a switching circuit for limiting the duty cycle of the switching DC-to-DC converter, when the gain level has decreased such that the switching DC-to-DC converter does not enter a region where the gain of the switching DC-to-DC converter has a negative slope.

23 Claims, 7 Drawing Sheets

(56) References Cited

U.S. PATENT DOCUMENTS

| | | | |
|---|---|---|---|
| 7,023,182 B1* | 4/2006 | Kleine | H02M 3/1584 |
| | | | 323/212 |
| 7,081,740 B2 | 7/2006 | King | |
| 7,098,641 B2 | 8/2006 | King | |
| 7,768,245 B1 | 8/2010 | De Cremoux | |
| 7,884,586 B2 | 2/2011 | Fabbro | |
| 8,310,222 B2* | 11/2012 | Tichy | H02M 3/1588 |
| | | | 323/283 |
| 2007/0195568 A1* | 8/2007 | Sato | H02J 7/0065 |
| | | | 363/123 |
| 2010/0301824 A1* | 12/2010 | Yamamoto | H02M 3/156 |
| | | | 323/283 |
| 2011/0062932 A1* | 3/2011 | Hawkes | H02M 3/156 |
| | | | 323/288 |
| 2011/0121653 A1 | 5/2011 | Hartular et al. | |
| 2013/0193941 A1 | 8/2013 | DeFazio | |
| 2014/0002037 A1 | 1/2014 | Babazadeh et al. | |
| 2016/0079748 A1* | 3/2016 | Sanchez Gonzalez | H02H 3/087 |
| | | | 361/18 |

OTHER PUBLICATIONS

Advanced Engineering Course on Power Management, MEAD Education S.A., EPFL Premises, Lausanne, Switzerland, Aug. 26-30, 2013, DC-DC Converter, Topologies, and Control Techniques, Converter Modeling and Feedback Loop Design, 17 pgs.

\* cited by examiner

CIRCUIT AND METHOD FOR MAXIMUM DUTY CYCLE LIMITATION IN SWITCHING CONVERTERS

RELATED PATENT APPLICATIONS

U.S. patent application Ser. No. 14/870,113, filed on Sep. 30, 2015, assigned to the same assignee as the present disclosure, and incorporated herein by reference in its entirety.

TECHNICAL FIELD

This disclosure relates generally to switching DC-to-DC power converters. More particularly, this disclosure relates to circuits and methods for duty cycle control in step up switching DC-to-DC power converters such as boost and buck-boost switching DC-to-DC power converters.

BACKGROUND

As is known in the art, switching DC-to-DC converters are used to change one DC voltage to another efficiently. There are three basic topologies of switching DC-to-DC converters: step-down (buck), step-up (boost), and step-down/step-up (buck-boost). The buck converter is used to generate a lower dc output voltage, the boost converter is used to generate a higher dc output voltage, and the buck/boost converter is used to generate an output voltage less than, greater than, or equal to the input voltage.

FIG. 1 is schematic of a boost switching DC-to-DC converter of the prior art. The boost switching DC-to-DC converter has an inductor L with a first terminal connected to a first terminal of a power supply voltage source $V_{in}$. A second terminal of the power supply voltage source $V_{in}$ is connected to a ground reference voltage source as a return current path. The associated parasitic resistances $R_W$ of the boost switching DC-to-DC converter is shown as a series resistance with the inductor L. The first terminal of the parasitic resistances $R_W$ is connected to a second terminal of the inductor L. The second terminal of the parasitic resistances $R_W$ is connected to a first terminal of a switch SW and the anode of a diode D. The cathode of the diode D is connected to a first terminal of a filter capacitor C and a first terminal of a load resistance $R_{LOAD}$. The cathode of the diode D, the first terminal of a filter capacitor C, and the first terminal of a load resistance $R_{LOAD}$ for the output terminal OUT of the boost switching DC-to-DC converter. A duty cycle control signal DC is applied to the control terminal of the switch SW.

The operation of the boost switching DC-to-DC converter begins with the activation of the power supply voltage source $V_{in}$. The inductor current IL flows through the inductor L, the parasitic resistances $R_W$, the diode D and the load resistance RL. A portion of the inductor current IL charges the capacitor CL. The switch SW is activated by the control signal DC and the diode D is inversely polarized and nonconducting. Consequently, there is no connection between the power supply voltage source $V_{in}$ and the load resistance RL and thus the voltage across the load resistance RL is developed by the charge of the capacitor CL. When the switch SW is deactivated, the diode D is polarized to be conducting to allow current to flow from the power supply voltage source $V_{in}$ to the load resistance RL.

Employing Kirchhoff's voltage and current laws, the output voltage $V_{OUT}$ at the output terminal can be calculated by the equations:

$$V_{OUT} = \frac{1}{1-DC} V_{IN}$$

Where
$V_{OUT}$ is the voltage at the output terminal OUT.
DC is the duty cycle of the control signal DC.
$V_{in}$ is the voltage of the power supply voltage source.

FIG. 2 is schematic of a buck-boost switching DC-to-DC converter of the prior art. The buck-boost switching DC-to-DC converter is capable of scaling the output voltage down with relation to the input voltage or amplifying the output voltage with relation to the input voltage. A buck-boost switching DC-to-DC converter may either invert the output voltage from the input voltage or be non-inverting with the output voltage having the same polarity as the input voltage. The buck-boost switching DC-to-DC converter of FIG. 2 is a non-inverting switching DC-to-DC converter.

The positive terminal of the power supply voltage source $V_{in}$ is connected to the source of the switching PMOS transistor $M_1$. The negative terminal of the power supply voltage source $V_{in}$ is connected to the ground reference voltage source. The drain of the switching PMOS transistor $M_1$ is connected to the first terminal of the inductor L and the drain of the switching NMOS transistor $M_2$. The gate of the switching PMOS transistor $M_1$ is connected to the control signal $\phi_1$ and the gate of the switching NMOS transistor $M_2$ is connected to the control signal $\phi_2$. The source of the NMOS transistor $M_2$ is connected to the ground reference voltage source.

The second terminal of the inductor L is connected to the drains of the NMOS transistor $M_3$ and the PMOS transistor $M_4$. The source of the NMOS transistor $M_3$ is connected to the ground reference voltage source. The source of the PMOS transistor $M_4$ is connected is connected to the first terminal of the filter capacitor CL and first terminal of the load resistor $R_{LOAD}$. The gate of the NMOS transistor $M_3$ is connected to the control signal $(1)_3$ and the gate of the PMOS transistor $M_4$ is connected to the control signal $c_4$. The source of the PMOS transistor $M_4$, the first terminal of the filter capacitor CL and the first terminal of the load resistor $R_{LOAD}$ form the output terminal OUT of the buck-boost switching DC-to-DC converter. The second terminal of the filter capacitor CL and the second terminal of the load resistor $R_{LOAD}$ are connected to the ground reference voltage source.

The PMOS transistor $M_1$ and the NMOS transistor $M_3$ simultaneously turn on and the NMOS transistor $M_2$ and the PMOS transistor $M_4$ turn off. The power supply voltage source $V_{in}$ is applied across the inductor L. The inductor current IL increases linearly and the filter capacitor CL provides power to the load resistor $R_{LOAD}$. When PMOS transistor $M_1$ and the NMOS transistor $M_3$ turn off and the NMOS transistor $M_2$ and the PMOS transistor $M_4$ turn on, the inductor current IL flows through the NMOS transistor $M_2$ and the PMOS transistor $M_4$ to deliver its stored energy to the output terminal OUT. The NMOS transistor $M_2$ and the PMOS transistor $M_4$ turn off, and their body diodes turn on until the control PMOS transistor $M_1$ and the NMOS transistor $M_3$ turn on.

Assuming no power loss in the components of the buck-boost switching DC-to-DC converter, the voltage gain with this control scheme under continuous current mode operation is given by the equation:

$$V_{OUT} = \frac{DC}{1-DC} V_{IN}$$

Where $V_{OUT}$ is the voltage at the output terminal OUT.

DC is the duty cycle of the control signal DC.

$V_{in}$ is the voltage of the power supply voltage source.

For the duty cycle DC of 50%, the output voltage $V_{OUT}$ is equal to the input voltage $V_{IN}$. The output voltage $V_{OUT}$ is lower than the input voltage $V_{IN}$ for a duty cycle DC less than 50%, and the output voltage $V_{OUT}$ is higher than the input voltage $V_{OUT}$ for the duty cycle DC greater than 50%.

The description above does not take the parasitic resistances $R_W$ into account. In both boost and buck-boost switching DC-to-DC converters, the gain or the ratio of the output voltage $V_{OUT}$ to the input voltage $V_{IN}$ (Vout/Vin) is inversely proportional to (1-D) which states voltage $V_{OUT}$ will reach infinity when the duty cycle DC=1.

The parasitic resistance $R_W$ is the total resistance in series with the inductor L. The parasitic resistance $R_W$ includes:
1. The equivalent series resistance (ESR) of the inductor L,
2. The parasitic resistances due to on-chip and off-chip connections,
3. The on-resistance due to diode D of FIG. 1 or pass PMOS transistor $M_4$ of FIG. 2 multiplied by one minus the duty cycle (1-DC),
4. The resistance of switch SW of FIG. 1 or the NMOS transistor $M_3$ multiplied by the duty cycle DC, and
5. In buck-boost switching DC-to-DC converter, the resistance of PMOS transistor $M_1$ of FIG. 2 when the converter is working in boost mode.

FIG. 3 is a plot of the effect of inductor winding resistance on the voltage gain of the boost switching DC-to-DC converter versus duty cycle of the prior art as shown in slide 25 of "Advanced Engineering Course on Power Management", Richard Redl, Lausanne, Switzerland, Aug. 26-30, 2013. The plot 5 illustrates the gain of the boost switching DC-to-DC converter versus the duty cycle DC illustrates the rise in the gain toward infinity with the duty cycle DC toward infinity with the parasitic resistance $R_W$ equal to zero. The plots 10, 15, 20, and 25 show the rise of the gain of the boost switching DC-to-DC converter to the peak values 30 where the slope becomes negative.

If the value of the duty cycle DC reaches right side or negative slope region beyond the peak 30, the output voltage $V_{OUT}$ will begin falling and the control loop of the boost switching DC-to-DC converter will increase the duty cycle DC further. This results in positive feedback increasing the duty cycle DC and eventually duty cycle DC will be stuck at 100% and the output voltage $V_{OUT}$ will be some low voltage. This problem becomes more significant in buck-boost switching DC-to-DC converter where the pass PMOS transistor $M_1$ and PMOS transistor $M_4$ of FIG. 2 are in series with the inductor for any given cycle.

One practical solution for this issue of the prior art is setting a limit for the duty cycle DC (e.g. limiting the duty cycle DC at 60%, such that it will not increase further). The duty cycle limit $D_{limit}$ is estimated considering the worst case scenario such as a minimum voltage level input power supply voltage source Vin, worst case temperature, maximum on resistance of the pass PMOS transistor M1, minimum load resistance RLOAD, etc. Setting a limit for the duty cycle DC based on worst case conditions also limits the operation of the switching converter in optimal conditions, as the duty cycle DC cannot exceed the duty cycle limit $D_{limit}$ in cases where it could be beneficial for system performance to utilize higher values of the duty cycle DC. This especially true when the switching DC-to-DC converter should utilize higher values of the duty cycle DC at low load conditions.

SUMMARY

An object of this disclosure is to provide an adaptive duty cycle limiting circuit for a switching DC-to-DC converter.

Another object of this disclosure is to provide a switching DC-to-DC converter that adaptively defines a maximum limit for duty cycle such that the switching DC-to-DC converter does not enter a region where the gain of the switching DC-to-DC converter has a negative slope.

Further another object of this disclosure is to provide a switching DC-to-DC converter that uses feedback from circuit operation for defining an adaptive limit for duty cycle so that the switching DC-to-DC converter becomes more flexible and efficient.

To accomplish at least one of these objects, an adaptive duty cycle limit control circuit has a current sensor to determine magnitude and direction of inductor current in a switching DC-to-DC converter. The current sensor is connected to a control terminal of an adjustable current source circuit that generates a replica current that is scaled to the inductor current. The adjustable current source has a first terminal connected to a first terminal of a replica parasitic resistor. The second terminal of the replica parasitic resistor is connected to a drain of a replica PMOS transistor. The source of the replica PMOS transistor is connected to the power supply voltage source and the gate of the replica PMOS transistor is connected such that the replica PMOS transistor is activated to conduct the replica current.

The voltage developed at the first terminal of the adjustable current source is related to the level of the duty cycle of the switching DC-to-DC converter. A comparator has a first terminal to receive a voltage having a level indicative of a maximum current limit value. The maximum current limit value voltage level is in various embodiments is approximately one half the voltage level of the power supply voltage source. When the voltage developed at the first terminal of the adjustable current source is greater than the maximum current limit value voltage level, the output of the comparator has a duty cycle limit signal that removes the inductor current from the output load. In various embodiments, the switching DC-to-DC converter is a step-up switching DC-to-DC converter such as a boost or buck-boost switching DC-to-DC converter.

In other embodiments that accomplish at least one of these objects, a switching DC-to-DC converter has an adaptive duty cycle limit control circuit that has a current sensor to determine magnitude and direction of inductor current in a switching DC-to-DC converter. The current sensor is connected to a control terminal of an adjustable current source circuit that generates a replica current that is scaled to the inductor current. The adjustable current source has a first terminal connected to a first terminal of a replica parasitic resistor. The second terminal of the replica parasitic resistor is connected to a drain of a replica PMOS transistor. The source of the replica PMOS transistor is connected to the power supply voltage source and the gate of the replica PMOS transistor is connected such that the replica PMOS transistor is activated to conduct the replica current.

The voltage developed at the first terminal of the adjustable current source is related to the level of the duty cycle of the switching DC-to-DC converter. A comparator has a first terminal to receive a voltage having a level indicative of a maximum current limit value. The maximum current limit value voltage level is in various embodiments is approximately one half the voltage level of the power supply voltage source. When the voltage developed at the first terminal of the adjustable current source is greater than maximum current limit value voltage level, the output of the comparator has a duty cycle limit signal that removes the inductor current from the output load.

The switching DC-to-DC converter has a control circuit for determining an operational duty cycle of the switching DC-to-DC converter that is based on the magnitude of the output voltage as compared with a reference voltage. The control circuit has a combinational logic circuit that combines the duty cycle limit signal with an operational duty cycle reset signal for determining the operational duty cycle of the switching DC-to-DC converter. In various embodiments, the switching DC-to-DC converter is a step-up switching DC-to-DC converter such as a boost or buck-boost switching DC-to-DC converter.

In other embodiments that accomplish at least one of these objects, a method of operation of a switching DC-to-DC converter having an adaptive duty cycle limit control circuit begins by sensing the inductor current of a filter section of the switching DC-to-DC converter. The sensed inductor current is used to generate a replica of the inductor current that is transferred through a replica of the parasitic resistances of the switching DC-to-DC converter. The parasitic resistances include:

1. The equivalent series resistance (ESR) of the inductor L,
2. The parasitic resistances due to on-chip and off-chip connections,
3. The on-resistance due to diode D of FIG. 1 or pass PMOS transistor $M_4$ of FIG. 2 multiplied by one minus the duty cycle (1-DC),
4. The resistance of switch SW of FIG. 1 or the NMOS transistor $M_3$ multiplied by the duty cycle DC, and
5. In buck-boost switching DC-to-DC converter, the resistance of PMOS transistor $M_1$ of FIG. 2 when the converter is working in boost mode.

The voltage developed across the parasitic resistances is compared with a voltage having a level indicative of a maximum current limit value. The maximum current limit value voltage level is in various embodiments is approximately one half the voltage level of the power supply voltage source. When the voltage developed across the parasitic resistances is greater than maximum current limit value voltage level, the output of the comparator has a duty cycle limit signal that removes the inductor current from the output load.

DETAILED DESCRIPTION

This disclosure provides circuits and methods for defining a maximum value of a duty cycle of a switching DC-to-DC converter such that as the parasitic resistance degrades the voltage gain of a switching DC-to-DC converter to the point that the slope of the voltage gain versus the duty cycle of the switching DC-to-DC converter becomes negative, the duty cycle is limited. To accomplish this, feedback from operation of the switching DC-to-DC converter is used for defining an adaptive limit of the duty cycle to prevent the switching DC-to-DC converter from entering a region of negative voltage gain. The maximum limit of the duty cycle is modified in operation such that the switching DC-to-DC converter becomes more flexible and efficient and is simpler to implement and has limited circuit spread.

The switching DC-to-DC converter circuit of this disclosure is best suited for a step-up switching DC-to-DC converter such as a boost and buck-boost switching DC-to-DC converter. For ease in understanding the structure of the switching DC-to-DC converter of this disclosure, the boost switching DC-to-DC converter as described in FIG. 1. The maximum duty cycle for the boost switching DC-to-DC converter is determined, as shown in Redl, by the equations:

$$V_{IN}I_L = R_W I_L^2 + \frac{V_{OUT}^2}{R_{LOAD}} \qquad \text{Eq. 1}$$

Where
$V_{in}$ is the voltage of the power supply voltage source.
$I_L$ is the current flowing through the inductor L
$R_W$ is the resistive value of the parasitic resistances.
$V_{OUT}$ is the voltage at the output terminal OUT.
$R_{LOAD}$ is the load resistance of the boost switching DC-to-DC converter.

Eq. 1 demonstrates that the input power is equal to the sum of the resistive loss and the output power.

$$(1 - DC)I_L = \frac{V_{OUT}}{R_{LOAD}} \qquad \text{Eq. 2}$$

Figure 1:
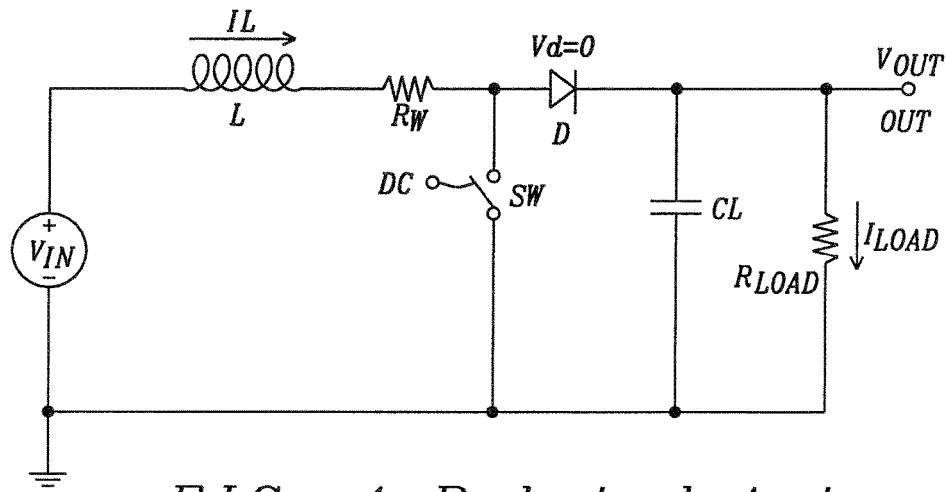
FIG. 1 is schematic of a boost switching DC-to-DC converter of the prior art.

From charge balance equation of Eq. 2, the average current through the diode D of FIG. 1 is equal to the load current $I_{LOAD}$.

Figure 3:
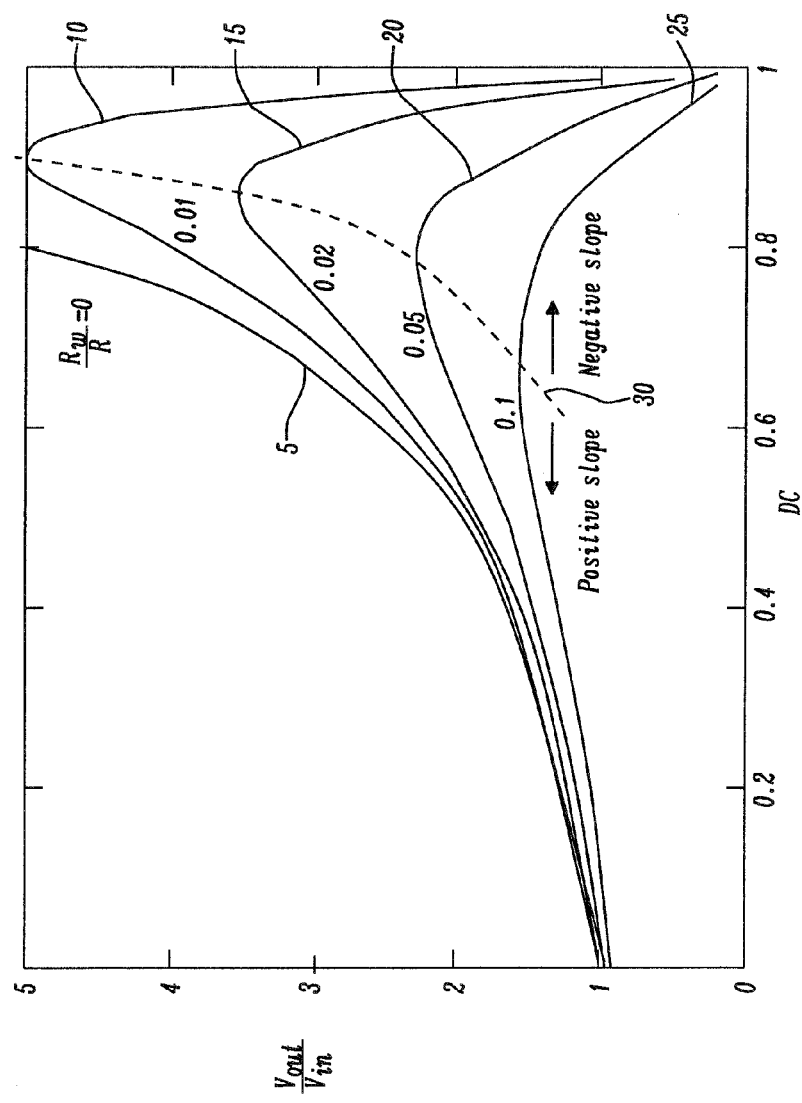
FIG. 3 is a plot of the effect of parasitic resistance on the voltage gain of the boost switching DC-to-DC converter versus duty cycle of the prior art.

By solving Eq. 1 and Eq. 2, the function for determining the plots of FIG. 3 is given by Eq. 3 as:

$$\frac{V_{OUT}}{V_{IN}} = \frac{1}{1 - DC} * \frac{1}{1 + \frac{R_W}{(1 - DC^2)R_{LOAD}}} \qquad \text{Eq. 3}$$

The maximum duty cycle $DC_{max}$ is determined by taking the derivative of Eq. 3 with respect to the duty cycle DC and solving the derivative of Eq. 3 equal to zero to find the value of the duty cycle DC where the gain Vout/Vin of the switching DC-to-DC converter circuit has a peak. The maximum duty cycle $DC_{max}$ is equal to:

$$DC_{max} = 1 - \sqrt{\frac{R_W}{R_{LOAD}}} \qquad \text{Eq. 4}$$

The maximum duty cycle $DC_{max}$ value should be the actual limit for duty cycle ($D_{LIMIT}$). But it has to be expressed in terms of parameters more compatible with analog design components of the switching DC-to-DC converter circuit. Therefore, Eq. 4 is substituted into Eq. 3 at the duty cycle DC equal to the maximum duty cycle $DC_{max}$. This achieves the equation:

$$\frac{V_{OUT}}{V_{IN}} = \frac{1}{2}\sqrt{\frac{R_{LOAD}}{R_W}} \qquad \text{Eq. 5}$$

and $$\frac{V_{OUT}}{V_{IN}} = \frac{1}{2(1-D_{max})} \qquad \text{Eq. 6}$$

To determine the value of the parasitic resistance $R_W$, Eq. 5 is squared and this the parasitic resistance $R_W$ becomes:

$$R_W = \frac{R_{LOAD} V_{IN}^2}{4 V_{OUT}^2} \qquad \text{Eq. 7}$$

Eq. 2 is solved for the load resistance $R_{LOAD}$ and is substituted into Eq. 7 and Eq. 7 thus becomes:

$$R_W I_L = \frac{V_{IN}^2}{4(1-D_{max})V_{OUT}} \qquad \text{Eq. 8}$$

Eq. 6 is solved for the voltage $V_{OUT}$ at the output terminal OUT and substituted in to Eq. 8 for simplification and Eq. 8 becomes:

$$R_W I_L = \frac{V_{IN}}{2} \qquad \text{Eq. 9}$$

This derives a condition for stability that ensures that the switching DC-to-DC converter circuit operates in the positive slope region when:

$$R_W I_L < \frac{V_{IN}}{2} \qquad \text{Eq. 10}$$

As described above, the parasitic resistance $R_W$ is the total resistance in series with the inductor L. The parasitic resistance includes:
1. The equivalent series resistance (ESR) of the inductor L,
2. The parasitic resistances due to on-chip and off-chip connections,
3. The on-resistance due to diode D of FIG. 1 or pass PMOS transistor $M_4$ of FIG. 2 multiplied by one minus the duty cycle (1-DC),
4. The resistance of switch SW of FIG. 1 or the NMOS transistor $M_3$ multiplied by the duty cycle DC, and
5. In buck-boost switching DC-to-DC converter, the resistance of PMOS transistor $M_1$ of FIG. 2 when the converter is working in boost mode.

Figure 4:
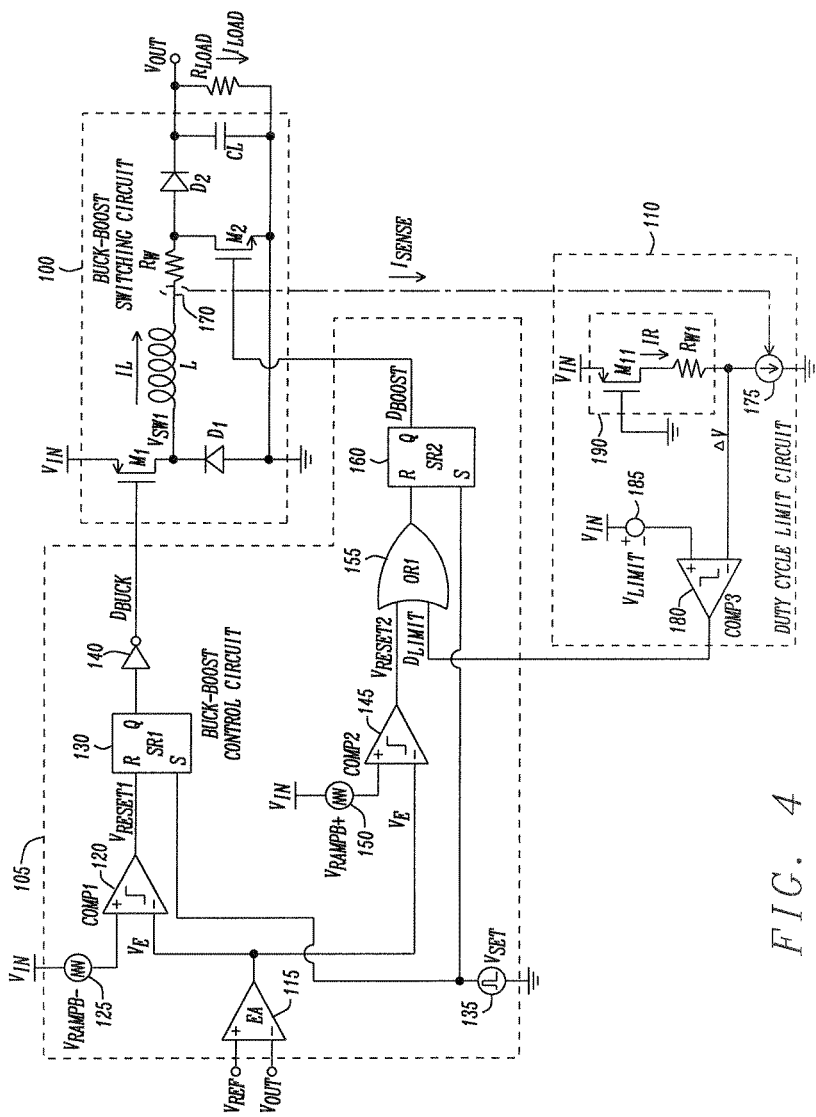
FIG. 4 is schematic of a buck-boost switching DC-to-DC converter embodying the principals of the present disclosure.

FIG. 4 is schematic of a buck-boost switching DC-to-DC converter embodying the principals of the present disclosure. The buck-boost switching DC-to-DC converter includes a switching circuit 100, a control circuit 105 and a duty cycle limiting circuit 110. The switching circuit 100 includes a buck switching PMOS transistor $M_1$, with a source connected to a power supply input voltage source $V_{IN}$, a drain connected to a first terminal of an inductor L, and a gate connected for receiving a buck switching control signal $D_{BUCK}$. The cathode of the diode $D_1$ is connected to the source of the buck switching PMOS transistor $M_1$ and the first terminal of the inductor L and the anode of the diode $D_1$ is connected to the ground reference voltage source.

For explanation of the functioning of the buck-boost switching DC-to-DC converter, a parasitic resistance $R_W$ is shown with its first terminal serially connected to the second terminal of the inductor L. The second terminal of the parasitic resistance $R_W$ is shown connected to the drain of a boost switching NMOS transistor $M_2$ and the anode of the diode $D_2$. In reality the parasitic resistance $R_W$ is composed of the resistances as described above. The source of the boost switching NMOS transistor $M_2$ is connected to the ground reference voltage supply. The gate of the boost switching NMOS transistor $M_2$ receives the boost switching control signal $D_{BOOST}$.

The anode of the diode $D_2$ is connected to the first terminal of the filter capacitor CL and the first terminal of the load resistor $R_{LOAD}$. The second terminal of the filter capacitor CL and the second terminal of the load resistor $R_{LOAD}$ are connected to the ground reference voltage source. The anode of the diode $D_2$, the first terminal of the filter capacitor CL, and the first terminal of the load resistor $R_{LOAD}$ are connected to the output terminal OUT to transfer the output voltage $V_{OUT}$ for powering external circuitry.

The control circuit receives a reference voltage $V_{REF}$ that provides a reference voltage level that is indicative of the desired output voltage level $V_{OUT}$. The reference voltage $V_{REF}$ and the output voltage level $V_{OUT}$ are the inputs to an error amplifier 115. The output of the error amplifier 115 is an error signal $V_E$ that is the voltage level of the difference between the voltage levels of the reference voltage $V_{REF}$ and the output voltage level $V_{OUT}$. A ramp generator 125 produces a buck ramp signal $V_{RAMPB-}$ that is applied to the noninverting input of the comparator 120. The error signal $V_E$ is applied to the inverting input of the comparator 120. The buck ramp signal $V_{RAMPB-}$ is compared with the error signal $V_E$ to produce a reset signal $V_{RESET1}$ at the output of the comparator 120 that is applied to the reset terminal R of the set-reset latch 130. The clock generator 135 produces a set clock signal $V_{SET}$ to the set terminal of the set-reset latch 130. The set clock signal $V_{SET}$ determines the beginning of a cycle of the operation of the buck-boost switching DC-to-DC converter. The output Q of the set-reset latch 130 is applied to the inverting driver 140 and the output of the inverting driver 140 is connected to the gate of the buck switching PMOS transistor $M_1$ to provide the buck switching control signal $D_{BUCK}$.

The error signal $V_E$ from the error amplifier 115 is also applied to the inverting input of the comparator 145. A ramp generator 150 produces a boost ramp signal $V_{RAMPS+}$ that is compared with the error signal $V_E$ in the comparator 120 to produce a reset signal $V_{RESET2}$ that is applied to a first terminal the logical OR circuit 155. The second terminal of the logical OR circuit 155 receives a duty cycle limit signal $D_{LIMIT}$. The duty cycle limit signal $D_{LIMIT}$ provides the indication that the gain $$\left(\frac{V_{OUT}}{V_{IN}}\right)$$

of the buck-boost switching DC-to-DC converter is at a point of inflection or has started to decrease for indicating that the duty cycle must be reduced. The output of the logical OR circuit 155 is applied to the reset terminal R of the set-reset latch 160. The set clock signal $V_{SET}$ is applied to the set terminal S of the set-reset latch 160. The output Q of the set-reset latch 160 is connected to the gate of the boost switching NMOS transistor $M_2$ to provide the boost switching control signal $D_{BOOST}$. The boost switching control signal $D_{BOOST}$ activates the boost switching NMOS transistor $M_2$ to divert the inductor current IL to the ground reference voltage source.

The buck switching PMOS transistor $M_1$ and the boost switching NMOS transistor $M_2$ are simultaneously turned on and the power supply voltage source $V_{in}$ is applied across the inductor L such that the inductor current IL increases linearly. In the mean time, the filter capacitor CL provides power to the load resistor $R_{LOAD}$. When buck switching PMOS transistor $M_1$ and the NMOS transistor $M_2$ turn off, the inductor current IL flows through the diode $D_2$ and the diode $D_2$ to deliver its stored energy to the output terminal OUT. With the ramp generator 125 and ramp generator 150 being separate, the turning off of the buck switching PMOS transistor $M_1$ and the boost switching NMOS transistor $M_2$ may occur at different times dependent on the slopes of the buck ramp signal $V_{RAMPB-}$ the ramp generator 125 and the boost ramp signal $V_{RAMPB+}$ of the ramp generator 150.

The buck-boost switching circuit 100 includes a current sensor 170 that is coupled to sense the current IL flowing through the inductor L. The sense signal $I_{SENSE}$ is the control signal to the duty cycle limit circuit 110. The sense signal $I_{SENSE}$ is applied to the adjustable current source 175 to adjust a replica current $I_R$. The duty cycle limiting circuit 110 has a parasitic replica circuit 190 that is formed of the replica switching PMOS transistor $M_{11}$ and the replica parasitic resistor $R_{W1}$. The replica switching PMOS transistor $M_{11}$ to have an equivalent resistance to the buck switching PMOS transistor $M_1$ and the diode $D_2$. The replica parasitic resistor $R_{W1}$ includes:

The equivalent series resistance (ESR) of the inductor L.
The parasitic resistances due to on-chip and off-chip connections.

The source of the replica switching PMOS transistor $M_{11}$ is connected to the power supply voltage source $V_{IN}$. The gate of the replica switching PMOS transistor $M_{11}$ is connected to the ground reference power supply. The drain of the replica switching PMOS transistor $M_{11}$ is connected to a first terminal of the replica parasitic resistor $R_{W1}$. A second terminal of the replica parasitic resistor $R_{W1}$ is connected to a first terminal of the adjustable current source 175 and the second terminal of the adjustable current source 175 is connected to the ground reference voltage source. The replica current $I_R$ flowing through the replica switching PMOS transistor $M_{11}$ and the replica parasitic resistor $R_{W1}$ develops a differential voltage $\Delta V$ at the junction of the second terminal of the replica parasitic resistor $R_{W1}$ and the first terminal of the adjustable current source 175. The junction of the second terminal of the replica parasitic resistor $R_{W1}$ and the first terminal of the adjustable current source 175 is connected to an inverting terminal—of the third comparator 180 to apply the differential voltage $\Delta V$ to the third comparator 180. The noninverting terminal+ of the third comparator 180 is connected to a first terminal of a limit voltage source 185. The second terminal of the limit voltage source 185 is connected to the power supply voltage source $V_{IN}$. The limit voltage source generates the limit voltage $V_{LIMIT}$ that is compared with the differential voltage $\Delta V$. $V_{LIMIT}$ is ideally Vin/2, based on Eq. 10 above, but preferably is programmable to also account for non-idealities such as inductance coil loss. When the limit voltage $V_{LIMIT}$ is greater than the differential voltage $\Delta V$, the output signal $D_{LIMIT}$ is set to an active level indicating the inductor current IL is decreasing relative to the duty cycle for the boost operation. The boost operation having a duty cycle greater than 50%. When the limit voltage $V_{LIMIT}$ is less than the differential voltage $\Delta V$, the output of the third comparator 180 is the duty cycle limit signal $D_{LIMIT}$. The duty cycle limit signal $D_{LIMIT}$ is applied to the logical OR circuit 155 for resetting the set-reset latch 160 when the gain of the buck-boost switching DC-to-DC converter has peaked and is starting to decrease.

When the buck-boost switching DC-to-DC converter is operating in buck mode the duty cycle of the buck-boost switching DC-to-DC converter is less than 50%. The differential voltage $\Delta V$ will always be less than the limit voltage $V_{LIMIT}$, thus holding the second set-reset latch 160 as being reset. The voltage level of the boost switching control signal $D_{BOOST}$ will be such that the NMOS transistor $M_2$ turns off is turned off during the buck operation.

Figure 2:
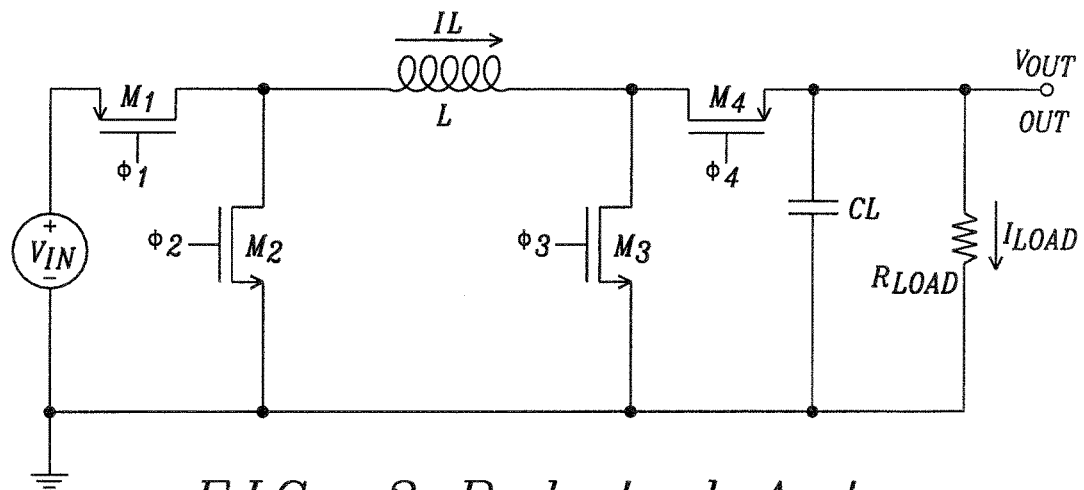
FIG. 2 is schematic of a buck-boost switching DC-to-DC converter of the prior art.

The effect of the parasitic resistance becomes more significant in buck-boost switching DC-to-DC converters where the diodes $D_1$ and $D_2$ are substituted with MOS switching transistors $M_2$ and $M_4$ as shown in FIG. 2. The MOS switching transistors $M_2$ and $M_4$ are in series with the inductor L (for any given cycle).

In buck-boost switching DC-to-DC converters for battery operated systems, for minimum supply voltage and worst case temperature and voltage operating conditions, the conduction or ON resistance of the buck switching PMOS transistor $M_1$ contributes to more than 50% of series resistance to inductor L. Similarly the equivalent series resistance of the inductor L and conduction losses of the wiring connections will contribute to about 25% of series resistance to the inductor L. The values of the parasitic resistance $R_W$ maybe simplified to the resistance parameters of the conduction or ON resistance of the buck switching PMOS transistor $M_1$ and the equivalent series resistance of the inductor L.

Value of the replica parasitic resistor $R_{W1}$ should be selected such that it replicates equivalent series resistance of the inductor L and other associated parasitic resistances such as the resistances of the wiring connections preferably with the correct temperature coefficient. It will be apparent to one skilled in the art, that the replica parasitic resistor $R_{W1}$ should be programmable to permit usage of different types of inductors L. Additionally, it is desirable to add some design margin to account for non-idealities in the circuitry.

For different applications other than buck-boost switching DC-to-DC converters, other resistive factors must be taken into account such as a replica the ON resistance of switching NMOS transistors instead of the replica switching PMOS transistor $M_{11}$.

The principals of the circuit that embody the present disclosure can be regarded as a protection circuit. The circuit as shown above insures that the control loop of the switching DC-to-DC converter is always in positive slope range. It is desirable that the protection turns on during load transients and input power supply voltage source $V_{IN}$ transients.

Figure 5:
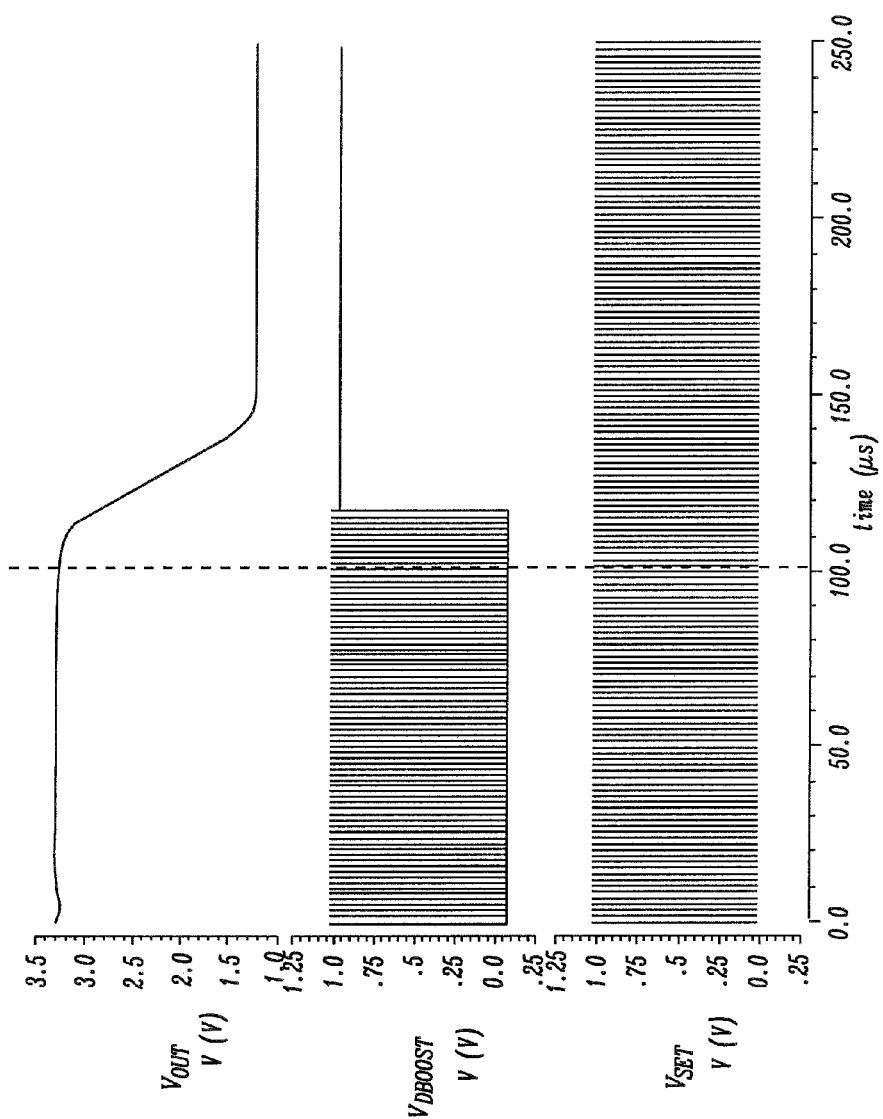
FIG. 5 is a plot of simulation results of the buck-boost switching DC-to-DC converter of the prior art of FIG. 2.

FIG. 5 is a plot of simulation results of the buck-boost switching DC-to-DC converter of the prior art of FIG. 2 and does not include the features embodying the principals of this disclosure. The simulation results for the buck-boost switching DC-to-DC converter of FIG. 2 has input voltage $V_{IN}$ equal to 2.5V, a clocking frequency $V_{SET}$ of control signals $\phi_1$, $\phi_2$, $\phi_3$, and $\phi_4$ of 3.0 MHz. At the time equal to 100 μs, the load current $I_{LOAD}$ starts to increase and output voltage $V_{ouT}$ starts to fall. With no protection from the duty cycle control signal $D_{LIMIT}$ of FIG. 4, the error voltage begins to increase and the boost switching control signal $D_{BOOST}$ continues to increase until is constantly on. The output voltage $V_{OUT}$ continues to decrease more and finally collapses.

Figure 6:
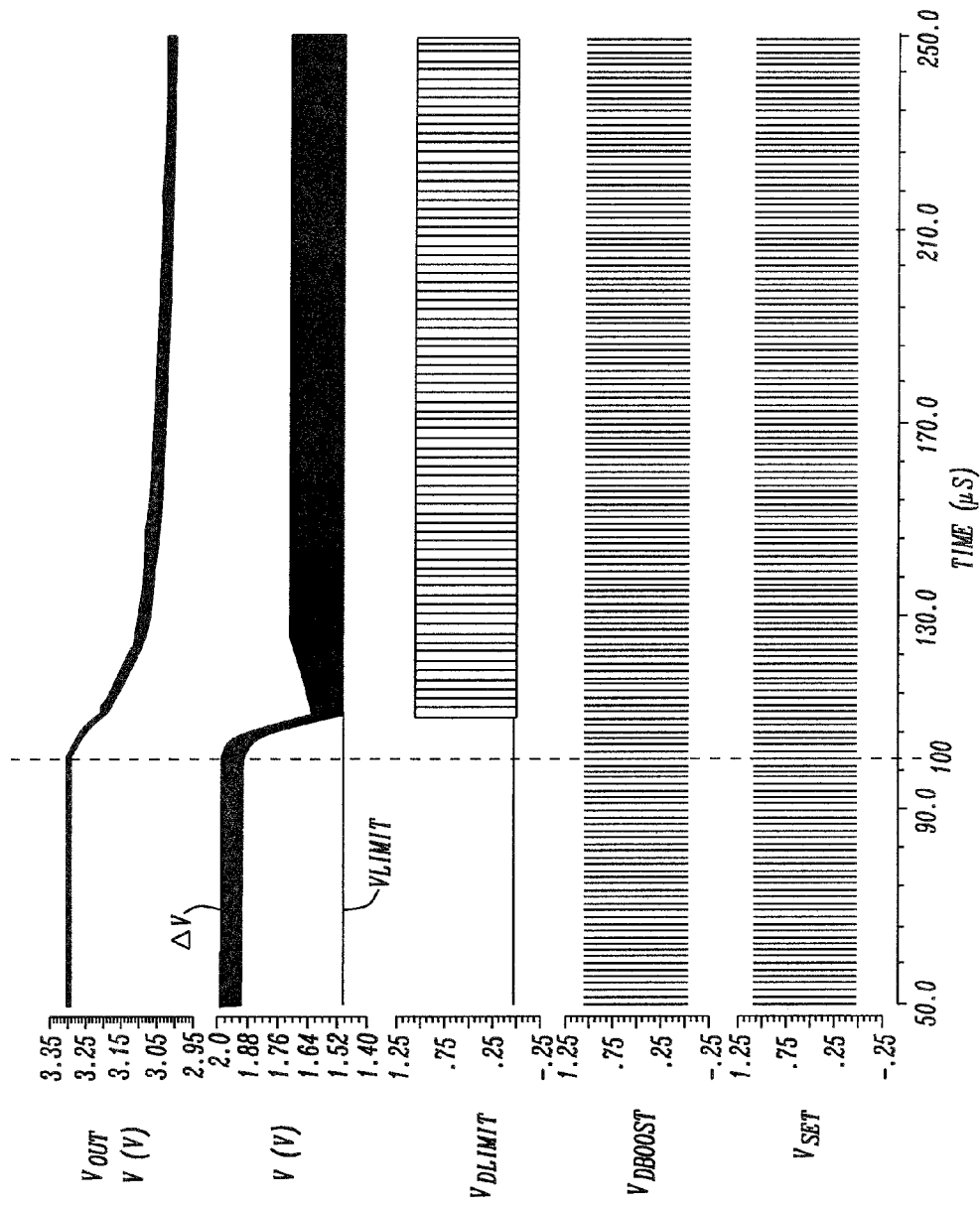
FIG. 6 is a plot of the simulation results of the buck-boost switching DC-to-DC converter embodying the principals of the present disclosure.
Figure 7:
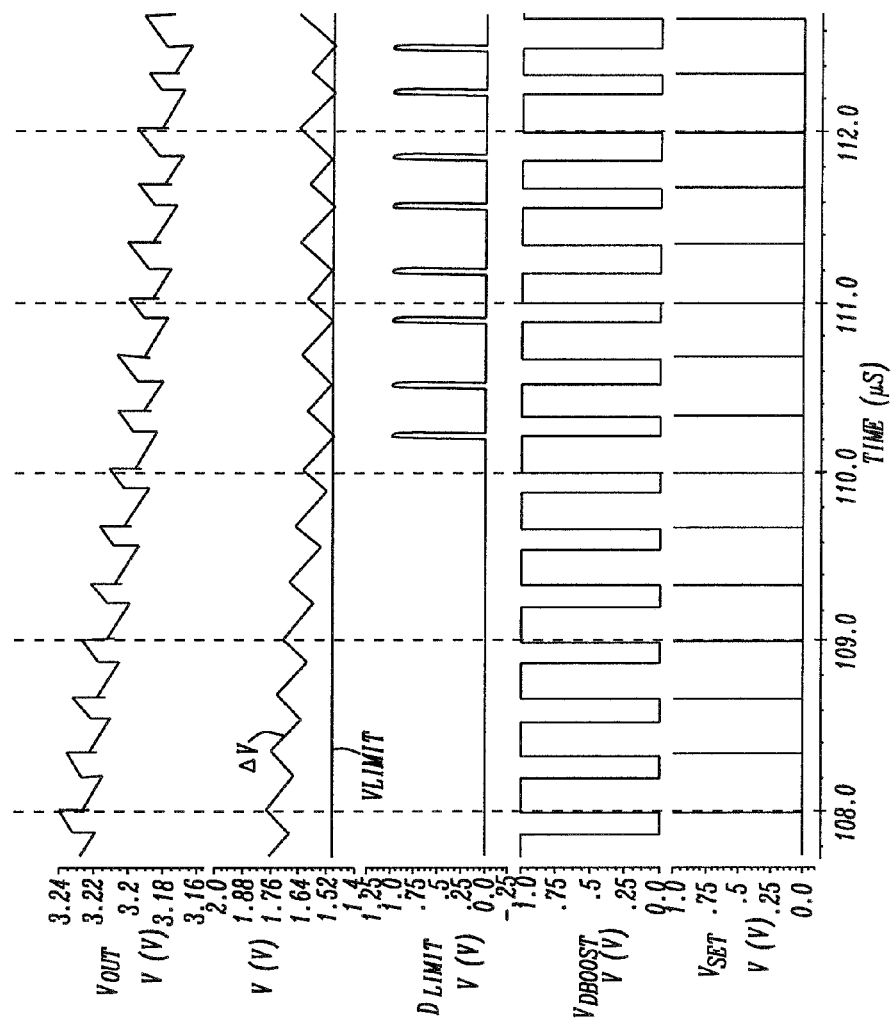
FIG. 7 is a plot of the simulation results of the buck-boost switching DC-to-DC converter embodying the principals of the present disclosure as shown in FIG. 6 with expanded time scale.

FIG. 6 is a plot of the simulation results of the buck-boost switching DC-to-DC converter embodying the principals of the present disclosure. FIG. 7 is a plot of the simulation results of the buck-boost switching DC-to-DC converter embodying the principals of the present disclosure as shown in FIG. 6 with expanded time scale. The simulation results for the buck-boost switching DC-to-DC converter of FIG. 4 has input voltage $V_{IN}$ equal to 2.5V, a reference voltage $V_{REF}$ equal to 60% of the input voltage $V_{IN}$. The clock generator 135 produces a set clock signal $V_{SET}$ with a frequency of 3.0 MHz. The limit voltage source 185 sets the limit voltage $V_{LIMIT}$ to 1.5V that is a 20% margin to input voltage $V_{IN}$.

Again, at the time equal to 100 μs, the load current $I_{LOAD}$ starts to increase and output voltage $V_{OUT}$ starts to fall. When load current $I_{LOAD}$ increases, the inductor current IL also increases. This causes the sense signal $I_{SENSE}$ to increase, thus increasing the current generated by the adjustable current source 175. This creates a larger differential voltage ΔV across the replica switching PMOS transistor $M_{11}$ and the replica parasitic resistor $R_{W1}$. The differential voltage ΔV eventually becomes equal to the limit voltage $V_{LIMIT}$ and the third comparator 180 generates the duty cycle limit signal $D_{limit}$ for limiting the duty cycle of the buck-boost switching DC-to-DC converter. The duty cycle limit signal $D_{limit}$ resets the set-reset latch 160 through the logical OR circuit 155. This causes the boost switching NMOS transistor $M_2$ to turn off, thus causing the inductor current IL to decrease until the next cycle of the clock generator 135 that generates the set clock signal $V_{SET}$.

In FIG. 6 at approximately the time 100 μs, it is observed that the first cycle starting at the set clock signal $V_{SET}$, the duty cycle DC is high and the operation is in negative slope region to the right side of the line 30 demonstrated with FIG. 3. When the duty cycle limit signal $D_{limit}$ is activated the next cycle has a limited duty cycle DC is approximately equal to 10% resulting an average duty cycle DC of approximately 55%.

Referring to FIG. 7, the duty cycle limit signal $D_{LIMIT}$ is activated when the differential voltage ΔV starts crossing the limit voltage $V_{LIMIT}$ threshold. It is observed that the actual duty cycle DC is limited, and boost switching control signal Dboost falls to zero with the rising edge of duty cycle limit signal $D_{LIMIT}$.

Figure 8:
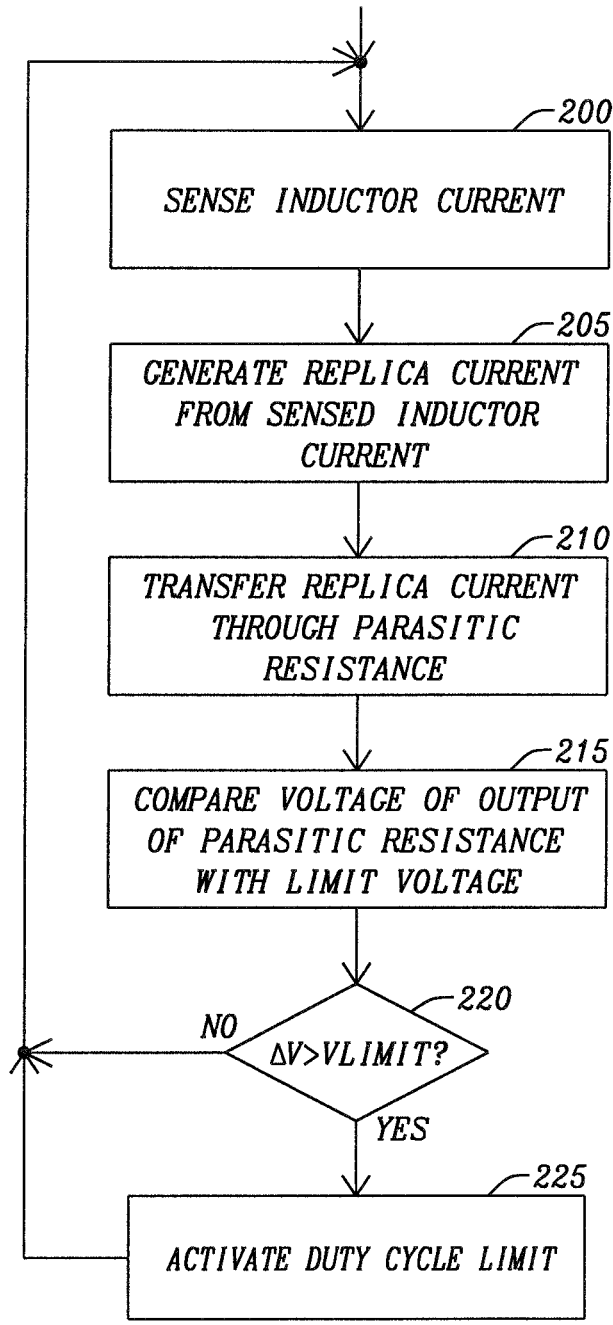
FIG. 8 is flow chart of a method for limiting duty cycle of buck-boost switching DC-to-DC converter embodying the principals of the present disclosure.

FIG. 8 is flow chart of a method for limiting duty cycle of buck-boost switching DC-to-DC converter embodying the principals of the present disclosure. Refer to FIG. 4 and FIG. 8 for a discussion of the method for limiting duty cycle of the buck boost switching converter of FIG. 4. The inductor current IL is sensed (Box 200) to create the sense signal $I_{SENSE}$. The sense signal $I_{SENSE}$ is applied to the adjustable current source 175 to generate (Box 205) a replica inductor current $I_R$. The replica inductor current $I_R$ is transferred (Box 210) through the parasitic replica circuit 190 that is formed of the replica switching PMOS transistor $M_{11}$ and the replica parasitic resistor $R_{W1}$. The differential voltage ΔV developed at the output of the parasitic replica circuit 190 is compared (Box 215) with the limit voltage $V_{LIMIT}$. If the differential voltage ΔV is greater than the limit voltage $V_{LIMIT}$, the duty cycle limit signal $D_{limit}$ is activated (Box 220) to reset the set-reset latch 160 through the logical OR circuit 155. This causes the boost switching NMOS transistor $M_2$ to turn off, thus causing the inductor current IL to decrease until the next cycle of the clock generator 135 that generates the set clock signal $V_{SET}$. If the differential voltage ΔV is less than the limit voltage $V_{LIMIT}$, the method is restarted for the next cycle of the set clock signal $V_{SET}$. The buck-boost switching DC-to-DC converter will continue to operate under the control of the error amplifier 115 until the differential voltage ΔV is greater than the limit voltage $V_{LIMIT}$.

The principals embodying this disclosure in FIG. 4 uses a buck-boost switching DC-to-DC converter. This structure of the duty cycle limiting circuit is not limited to a buck-boost switching DC-to-DC converter and includes any step up DC-to-DC converter where the circuit parasitic resistances impact the output voltage as the load current causes the duty cycle to increase to the level that it is approaching 100%

While this disclosure has been particularly shown and described with reference to the preferred embodiments thereof, it will be understood by those skilled in the art that various changes in form and details may be made without departing from the spirit and scope of the disclosure.

What is claimed is:

1. An adaptive duty cycle limiting circuit included within a switching DC-to-DC converter, the adaptive duty cycle limiting circuit comprising:
    an inductor current feedback circuit for generating a current sense signal indicative of a level of current through an inductor within the switching DC-to-DC converter; and
    a limit circuit configured for generating an adaptive limit signal from a replica signal of the current sense signal that is transferred through a parasitic resistance of a switching circuit of the switching DC-to-DC converter to generate a voltage drop signal across the parasitic resistance, configured for comparing the voltage drop signal with a voltage having a level indicative of a maximum current limit value to determine if a gain level of the switching DC-to-DC converter has decreased even though the duty cycle has increased, and configured for transferring the adaptive limit signal is transferred to a switching circuit for disabling a switch for limiting the duty cycle of the switching DC-to-DC converter such that the switching DC-to-DC converter does not enter a region where the gain of the switching DC-to-DC converter has a negative slope, when the gain has decreased.

2. The adaptive duty cycle limiting circuit of claim 1 wherein the switching DC-to-DC converter is a step up switching DC-to-DC converter for providing an output voltage that is greater than the input voltage of the switching DC-to-DC converter.

3. The adaptive duty cycle limiting circuit of claim 1 wherein in the step up switching DC-to-DC converter is a buck-boost switching DC-to-DC converter or a boost switching DC-to-DC converter.

4. An adaptive duty cycle limiting circuit included within a switching DC-to-DC converter, the adaptive duty cycle limiting circuit comprising:
 a current sensor to determine magnitude and direction of inductor current in the switching DC-to-DC converter;
 adjustable current source circuit in communication with the current sensor for generating a replica current that is scaled to the inductor current;
 a replica parasitic resistance circuit for replicating a parasitic resistance of a switching circuit of the switching DC-to-DC converter and connected for receiving the replica current from the adjustable current source circuit for determining a differential signal indicative of a duty cycle of the switching DC-to-DC converter; and
 a comparator circuit configured for receiving the differential signal and comparing the differential signal with a maximum limit signal to determine if a gain level of the switching DC-to-DC converter has decreased even though the duty cycle has increased, wherein if the gain level has decreased, the comparator generates a duty cycle limit signal to be transferred to a switching circuit for disabling the switch for limiting the duty cycle of the switching DC-to-DC such that the switching DC-to-DC converter does not enter a region where the gain of the switching DC-to-DC converter has a negative slope.

5. The adaptive duty cycle limiting circuit of claim 4 wherein the switching DC-to-DC converter is a step up switching DC-to-DC converter for providing an output voltage that is greater than the input voltage of the switching DC-to-DC converter.

6. The adaptive duty cycle limiting circuit of claim 5 wherein in the step up switching DC-to-DC converter is a buck-boost switching DC-to-DC converter or a boost switching DC-to-DC converter.

7. The adaptive duty cycle limiting circuit of claim 4 wherein the replica parasitic resistance circuit comprises:
 a replica parasitic resistor configured for replicating an equivalent series resistance (ESR) of the inductor of the switching DC-to-DC converter and parasitic resistances of connections with the switching DC-to-DC converter; and
 a replica pass MOS transistor having a drain connected to the replica parasitic resistor and configured for being activated to conduct the replica current.

8. The adaptive duty cycle limiting circuit of claim 4 wherein the maximum limit signal is a voltage level is approximately one half a voltage level of an input power supply voltage source of the switching DC-to-DC converter.

9. A switching DC-to-DC converter comprising an adaptive duty cycle limit control circuit comprising:
 a current sensor to determine magnitude and direction of inductor current in the switching DC-to-DC converter;
 adjustable current source circuit in communication with the current sensor for generating a replica current that is scaled to the inductor current;
 a replica parasitic resistance circuit for replicating a parasitic resistance of a switching circuit of the switching DC-to-DC converter and connected for receiving the replica current from the adjustable current source circuit for determining a differential signal indicative of a duty cycle of the switching DC-to-DC converter; and
 a comparator circuit configured for receiving the differential signal and comparing the differential signal with a maximum limit signal to determine if a gain level of the switching DC-to-DC converter has decreased even though the duty cycle has increased, wherein if the gain level has decreased, the comparator generates a duty cycle limit signal to be transferred to a switching circuit for disabling the switch for limiting the duty cycle of the switching DC-to-DC such that the switching DC-to-DC converter does not enter a region where the gain of the switching DC-to-DC converter has a negative slope.

10. The switching DC-to-DC converter of claim 9 wherein the switching DC-to-DC converter is a step up switching DC-to-DC converter for providing an output voltage that is greater than the input voltage of the switching DC-to-DC converter.

11. The switching DC-to-DC converter of claim 10 wherein in the step up switching DC-to-DC converter is a buck-boost switching DC-to-DC converter or a boost switching DC-to-DC converter.

12. The switching DC-to-DC converter of claim 9 wherein the maximum limit signal is a voltage level approximately one half a voltage level of an input power supply voltage source of the switching DC-to-DC converter.

13. The switching DC-to-DC converter of claim 10 wherein the replica parasitic resistance circuit comprises:
 a replica parasitic resistor configured for replicating an equivalent series resistance (ESR) of the inductor of the switching DC-to-DC converter and parasitic resistances of connections with the switching DC-to-DC converter; and
 a replica pass MOS transistor having a drain connected to the replica parasitic resistor and configured for being activated to conduct the replica current.

14. A method of operation of a switching DC-to-DC converter having an adaptive duty cycle limit control circuit comprising the steps of:
 sensing the inductor current of a filter section of the switching DC-to-DC converter to generate a signal indicative of magnitude of the inductor current;
 generating a replica signal from the signal indicative of the magnitude of the inductor current;
 transferring the replica signal through a replica parasitic resistance circuit that replicates a parasitic resistance of a switching circuit of the switching DC-to-DC converter;
 comparing a voltage developed across the replica parasitic resistances with a voltage having a level indicative of a maximum current limit value to determine if a gain level of the switching DC-to-DC converter has decreased even though the duty cycle has increased; and
 if the gain level has decreased, generating a duty cycle limit signal to be transferred to a switching circuit for disabling the switch for limiting the duty cycle of the switching DC-to-DC such that the switching DC-to-DC converter does not enter a region where the gain of the switching DC-to-DC converter has a negative slope.

15. The method of claim 14 wherein a comparator performs the step of comparing the voltage developed across the replica parasitic resistances with a maximum limit voltage level having a level indicative of a maximum current limit value and the maximum limit voltage level approximately one half the voltage level of the power supply voltage source of the switching DC-to-DC converter.

16. The method of claim 14 wherein the switching DC-to-DC converter is a step up switching DC-to-DC converter for providing an output voltage that is greater than the input voltage of the switching DC-to-DC converter.

17. The method of claim 15 wherein in the step up switching DC-to-DC converter is a buck-boost switching DC-to-DC converter or a boost switching DC-to-DC converter.

18. The method of claim 14 wherein the replica parasitic resistances comprise:
  a replica parasitic resistor configured for replicating an equivalent series resistance (ESR) of the inductor of the switching DC-to-DC converter and parasitic resistances of connections with the switching DC-to-DC converter; and
  a replica pass MOS transistor having a drain connected to the replica parasitic resistor and configured for being activated to conduct the replica current.

19. An apparatus for operating a switching DC-to-DC converter having an adaptive duty cycle limit control circuit comprising:
  means for sensing the inductor current of a filter section of the switching DC-to-DC converter to generate a signal indicative of magnitude of the inductor current;
  means for generating a replica signal from the signal indicative of the magnitude of the inductor current;
  means for transferring the replica signal through a replica parasitic resistance circuit that replicates a parasitic resistance of a switching circuit of the switching DC-to-DC converter;
  means for comparing a voltage developed across the replica parasitic resistances with a maximum limit voltage level having a level indicative of a maximum current limit value to determine if a gain level of the switching DC-to-DC converter has decreased even though the duty cycle has increased; and
  means for generating a duty cycle limit signal to be transferred to a switching circuit for disabling the switch for limiting the duty cycle of the switching DC-to-DC, if the gain level has decreased such that the switching DC-to-DC converter does not enter a region where the gain of the switching DC-to-DC converter has a negative slope.

20. The apparatus of claim 19 wherein the maximum limit voltage level is approximately one half the voltage level of the power supply voltage source of the switching DC-to-DC converter.

21. The apparatus of claim 19 wherein the switching DC-to-DC converter is a step up switching DC-to-DC converter for providing an output voltage that is greater than the input voltage of the switching DC-to-DC converter.

22. The apparatus of claim 21 wherein in the step up switching DC-to-DC converter is a buck-boost switching DC-to-DC converter or a boost switching DC-to-DC converter.

23. The apparatus of claim 19 wherein the replica parasitic resistances comprise:
  a replica parasitic resistor configured for replicating an equivalent series resistance (ESR) of the inductor of the switching DC-to-DC converter and parasitic resistances of connections with the switching DC-to-DC converter; and
  a replica pass MOS transistor having a drain connected to the replica parasitic resistor and configured for being activated to conduct the replica current.

* * * * *